US012222666B2

(12) United States Patent
Nishimura et al.

(10) Patent No.: US 12,222,666 B2
(45) Date of Patent: Feb. 11, 2025

(54) FIXING DEVICE INCLUDING PRESSURE ROLLER WHOSE ELASTIC LAYER HAS LITTLE IMPACT ON NIP WIDTH DUE TO THERMAL EXPANSION

(71) Applicant: Brother Kogyo Kabushiki Kaisha, Nagoya (JP)

(72) Inventors: Takuya Nishimura, Nukata (JP); Makoto Souda, Nagoya (JP); Kazuna Taguchi, Nagoya (JP); Yasutada Kato, Nagoya (JP); Shinichi Hatakeyama, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/340,088

(22) Filed: Jun. 23, 2023

(65) Prior Publication Data

US 2024/0004333 A1 Jan. 4, 2024

(30) Foreign Application Priority Data

Jun. 30, 2022 (JP) ................................ 2022-105653

(51) Int. Cl.
*G03G 15/20* (2006.01)

(52) U.S. Cl.
CPC ..... *G03G 15/2057* (2013.01); *G03G 15/2064* (2013.01)

(58) Field of Classification Search
CPC ........... G03G 15/2017; G03G 15/2053; G03G 15/2057; G03G 15/206; G03G 15/2064; G03G 2215/2003
See application file for complete search history.

(56) References Cited

U.S. PATENT DOCUMENTS

2003/0152405 A1* 8/2003 Takeuchi ........... G03G 15/2053 399/328
2005/0214044 A1 9/2005 Sakakibara et al.
2011/0243620 A1* 10/2011 Mitsuhashi ........ G03G 15/2025 399/327
2014/0105633 A1* 4/2014 Takahashi .......... G03G 15/2053 399/329
2020/0073295 A1 3/2020 Taguchi et al.

FOREIGN PATENT DOCUMENTS

JP 2001-065544 A 3/2001
JP 2005-273771 A 10/2005
JP 2016-194541 A 11/2016
JP 2020-034154 A 3/2020

* cited by examiner

*Primary Examiner* — Thomas S Giampaolo, II
(74) *Attorney, Agent, or Firm* — KENEALY VAIDYA LLP

(57) ABSTRACT

A fixing device incorporated in a main body of an image forming apparatus includes a heater, a rotatable body, and a pressure roller. The rotatable body is configured to be heated by the heater. The pressure roller is configured to form a nip region in cooperation with the rotatable body to nip a sheet at the nip region between the pressure roller and the rotatable body. The pressure roller includes a shaft, and an elastic layer covering a peripheral surface of the shaft. The elastic layer has a thickness of at least 1 millimeter to at most 3 millimeters. The pressure roller has a peripheral surface whose hardness is in a range of at least 60 to at most 67 on the Asker C scale.

11 Claims, 6 Drawing Sheets

FIG. 6

| | COMPARATIVE EXAMPLE 1 | COMPARATIVE EXAMPLE 2 | EXAMPLES | | | | | | | | | | COMPARATIVE EXAMPLE 3 |
|---|---|---|---|---|---|---|---|---|---|---|---|---|---|
| | | | 1 | 2 | 3 | 4 | 5 | 6 | 7 | 8 | 9 | 10 | |
| ROLLER HARDNESS H [° ] (ASKER C) | 59 | 60 | 60 | 62 | 63 | | | 64 | 66 | 67 | | | 68 |
| ELASTIC LAYER THICKNESS T [mm] | 3 | 4 | 3 | 2 | 2 | 3 | 2 | 2 | 2 | 2 | 1 | 2 | 1 |
| PRESSURE ROLLER OUTER DIAMETER DP [mm] | 20.8 | 20.8 | 20.8 | | | | 21.15 | | | 21.55 | 22 | | 22 |
| SPRING LOAD [N] | 15 | 15 | 15 | 25 | 30 | 20 | 25 | 30 | 35 | 40 | 40 | 35 | 40 |
| LOAD PER UNIT LENGTH [N/cm] | 2.90 | 2.90 | 2.90 | 4.83 | 5.80 | 3.86 | 4.83 | 5.80 | 6.76 | 7.73 | 7.73 | 6.76 | 7.73 |
| STRAIN AS WHEN NIP IS FORMED [%] | 48 | 46 | 43 | 42 | 39 | 40 | 40 | 38 | 36 | 39 | 35 | 36 | 32 |
| FIXING PERFORMANCE | A | A | A+ | A+ | A+ | A+ | A+ | A+ | A+ | A+ | A | A+ | F |
| CONVEYING PERFORMANCE | F | F | A | A+ | A+ | A | A+ | A+ | A+ | A+ | A+ | A+ | F |

A+ : EXCELLENT A : GOOD F : FAIL

FIXING DEVICE INCLUDING PRESSURE ROLLER WHOSE ELASTIC LAYER HAS LITTLE IMPACT ON NIP WIDTH DUE TO THERMAL EXPANSION

REFERENCE TO RELATED APPLICATIONS

This application claims priority from Japanese Patent Application No. 2022-105653 filed on Jun. 30, 2022. The entire content of the priority application is incorporated herein by reference.

BACKGROUND ART

There is conventionally known a fixing device provided inside a main body of an image forming apparatus for fixing a toner image onto a sheet. Such a fixing device includes a heating unit and a pressure roller. The sheet is heated and applied with pressure when passing through a position between the heating unit and the pressure roller, so that the toner image on the sheet is thermally fixed thereto.

DESCRIPTION

There has been a demand to downsize such a conventional fixing device. To this effect, if the pressure roller is to be made smaller in size in order to realize the downsizing of the fixing device, obtaining an adequate nip width may be difficult. Accordingly, in order to secure an adequate nip width in a compact structure, a thickness of an elastic layer of the pressure roller may be increased. However, as the thickness of the elastic layer of the pressure roller increases, the elastic layer may become more susceptible to thermal expansion, which may cause greater variations in the nip width. If the nip width varies significantly, a belt of the heating unit is likely to slip relative to the pressure roller when forming a nip therebetween, which may possibly result in wrinkles on the sheet. Such wrinkles on the sheet may hinder correct thermal fixing of the toner image on the sheet, resulting in poor image quality.

In view of the foregoing, it is an object of the disclosure to reduce an amount of change in the nip width due to thermal expansion of the elastic layer of the pressure roller.

In order to attain the above and other objects, according to one aspect, the disclosure provides a fixing device incorporated in a main body of an image forming apparatus. The fixing device includes a heater, a rotatable body configured to be heated by the heater, and a pressure roller configured to form a nip region in cooperation with the rotatable body to nip a sheet at the nip region between the pressure roller and the rotatable body. The pressure roller includes a shaft, and an elastic layer covering a peripheral surface of the shaft. The elastic layer has a thickness of at least 1 millimeter to at most 3 millimeters. The pressure roller has a peripheral surface whose hardness is in a range of at least 60 to at most 67 on the Asker C scale.

With the above configuration, when the fixing device performs thermal fixation on a sheet, an adequate nip width can be ensured without being affected too much by thermal expansion of the elastic layer of the pressure roller. Accordingly, with this configuration of the disclosure, a smaller variation can result in the nip width in response to the thermal expansion of the elastic layer of the pressure roller, thereby realizing adequate thermal fixing performance and adequate sheet conveying performance.

FIG. 6 is a table showing evaluations and results of tests performed on examples 1-10 and comparative examples 1-3.

EMBODIMENT

Hereinafter, a fixing device 1 according to one embodiment of the present disclosure will be described with reference to accompanying drawings.

Figure 1A:
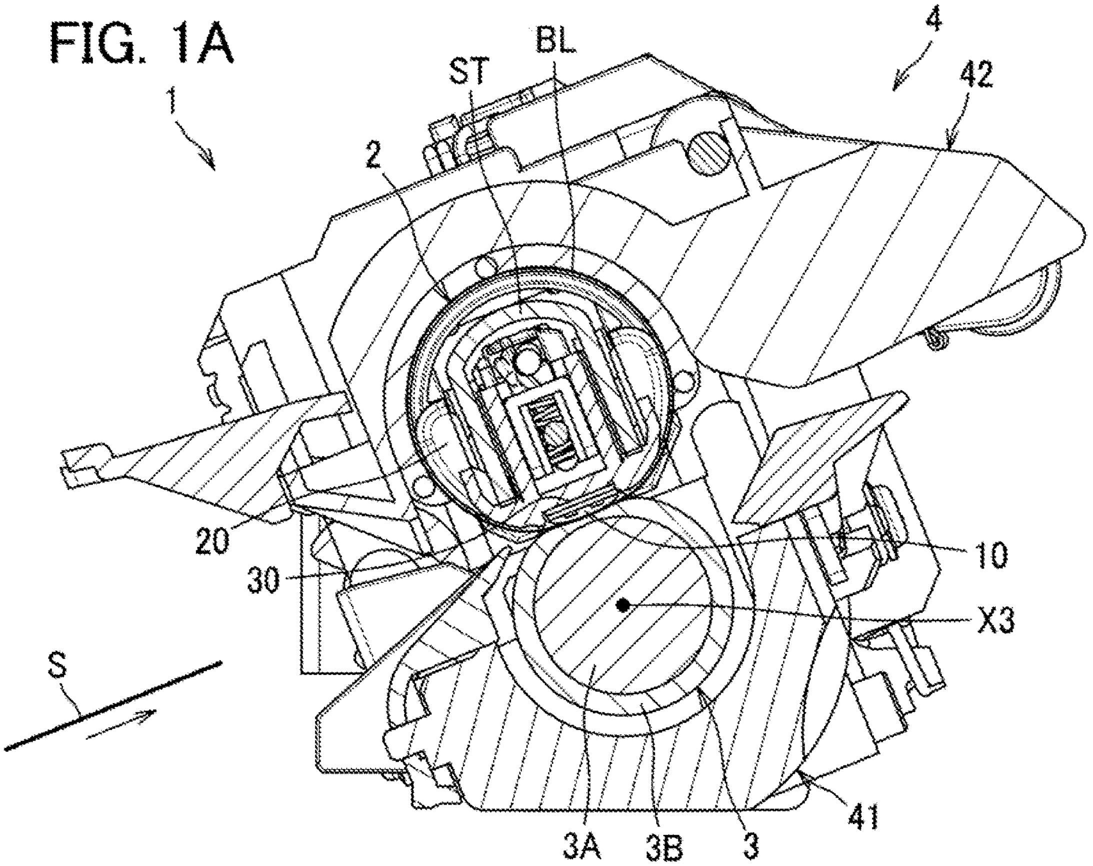
FIG. 1A is a schematic cross-sectional view of a fixing device according to one embodiment of the disclosure.

Referring to FIG. 1A, the fixing device 1 according to the embodiment is incorporated in a main body of an image forming apparatus. The fixing device 1 is configured to thermally fix a toner image on a sheet S.

The fixing device 1 includes a heating unit 2, a pressure roller 3, and a frame 4.

The heating unit 2 includes a heater 10, a holder 20, a heat conduction member 30, a stay ST, and a belt BL. The heater 10 is configured to heat the belt BL for heating the sheet S through the belt BL.

Figure 1B:
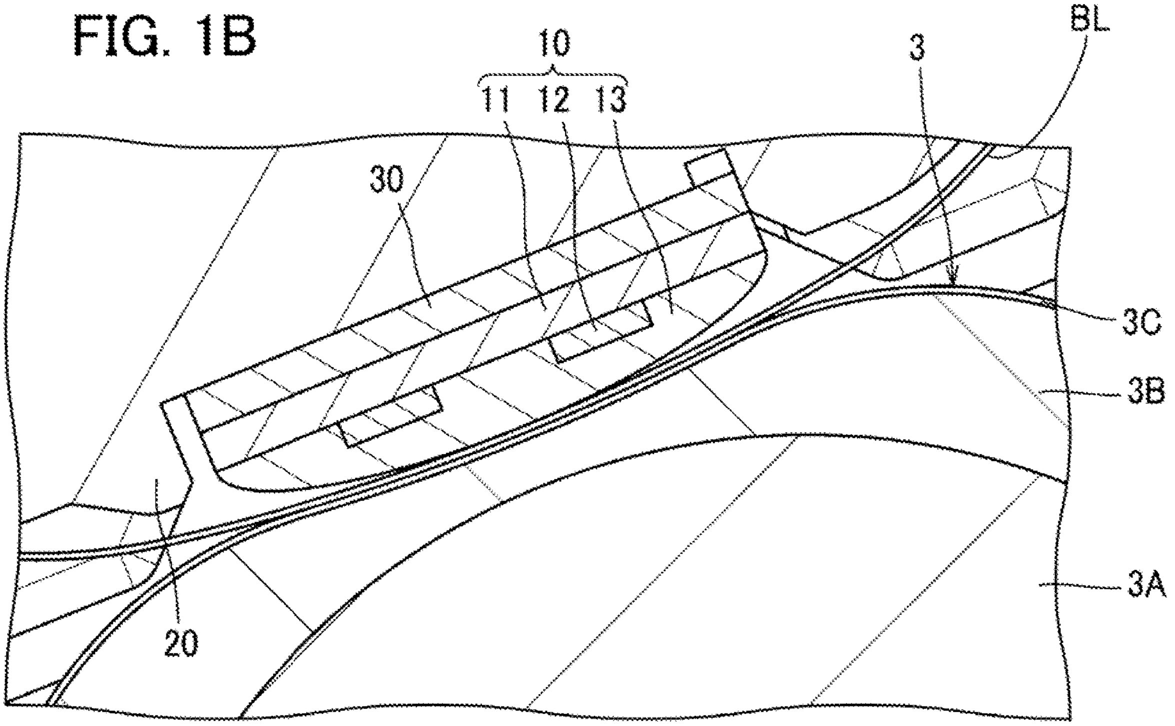
FIG. 1B is a partially enlarged cross-sectional view of a structure near a heater of the fixing device.

The heater 10 is a so-called ceramic heater. As illustrated in FIG. 1B, the heater 10 includes a substrate 11, a pair of resistance heating elements 12 mounted on the substrate 11, and a cover 13.

The substrate 11 is in a form of an elongated rectangular plate made of a ceramic material such as aluminum oxide. The substrate 11 has one surface on which the resistance heating elements 12 are formed by printing. The cover 13 covers the resistance heating elements 12. The cover 13 is made of glass, for example.

As illustrated in FIG. 1A, the holder 20 supports the heater 10. The holder 20 also has a function to guide the belt BL. The holder 20 is made of resin, for example.

The stay ST supports the holder 20. The stay ST is made of metal, for example.

The belt BL is an endless belt. The belt BL is circularly movable around the heater 10 while the belt BL is being guided by the holder 20. The belt BL has an inner peripheral surface and an outer peripheral surface. The outer peripheral surface of the belt BL is configured to contact the pressure roller 3 or the sheet S (as a target to be heated). The inner peripheral surface of the belt BL is in contact with the heater 10.

While circularly moving, the belt BL is configured to convey the sheet S in cooperation with the pressure roller 3.

Figure 4:
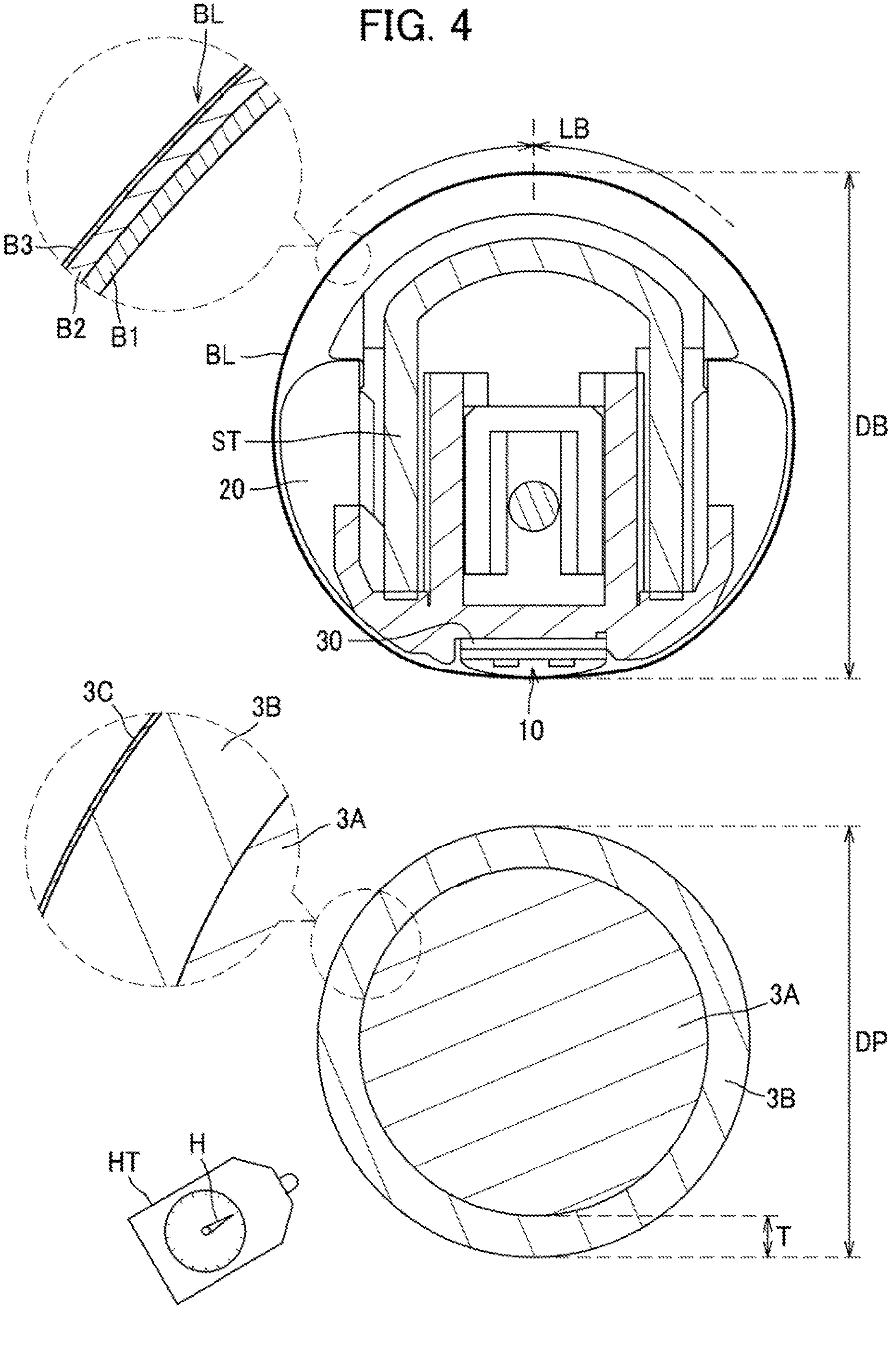
FIG. 4 is a cross-sectional view for description of a heating unit and a pressure roller of the fixing device.

As illustrated in FIG. 4, the belt BL includes a base layer B1, an elastic layer B2, and a surface layer B3. The base layer B1 contains polyimide, for example. The elastic layer B2 covers an outer peripheral surface of the base layer B1. The elastic layer B2 contains silicone rubber, for example. The surface layer B3 is provided on an outer peripheral surface of the elastic layer B2 to cover the same. The surface layer B3 contains fluorine resin.

Assuming that the belt BL is formed in a cylindrical shape (see FIG. 4), preferably, the belt BL has an outer diameter DB of at least 24 millimeters to at most 26 millimeters (i.e., in a range of 24 mm≤DB≤26 mm). Further, preferably, the belt BL has an outer circumferential length LB that is in a range of at least 75 millimeters to at most 82 millimeters (i.e., in a range of 75 mm≤LB≤82 mm).

Returning to FIG. 1B, the heat conduction member 30 is configured to conduct heat generated by the heater 10 in the longitudinal direction thereof to provide a uniform temperature along the entire length of the heater 10 in the longitudinal direction. The heat conduction member 30 has a plate-like shape and is positioned between the heater 10 and the holder 20. In a state where the sheet S is nipped between the heating unit 2 and the pressure roller 3, the heat conduction member 30 is interposed between the heater 10 and the holder 20. The heat conduction member 30 is made of aluminum, for example.

Figure 2:
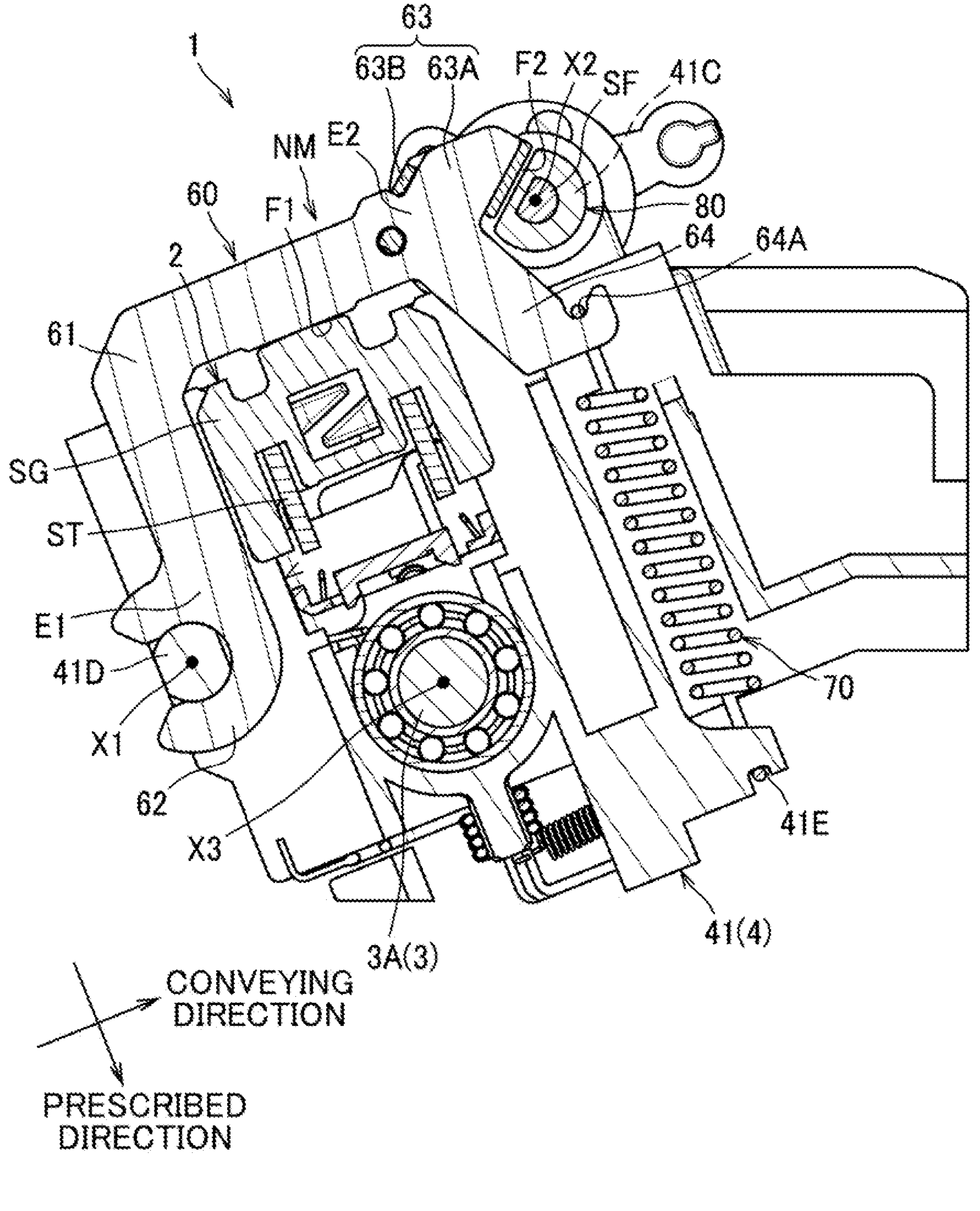
FIG. 2 is a schematic cross-sectional view of a nipping pressure changing mechanism of the fixing device in a state where a first nipping pressure is applied.
Figure 3:
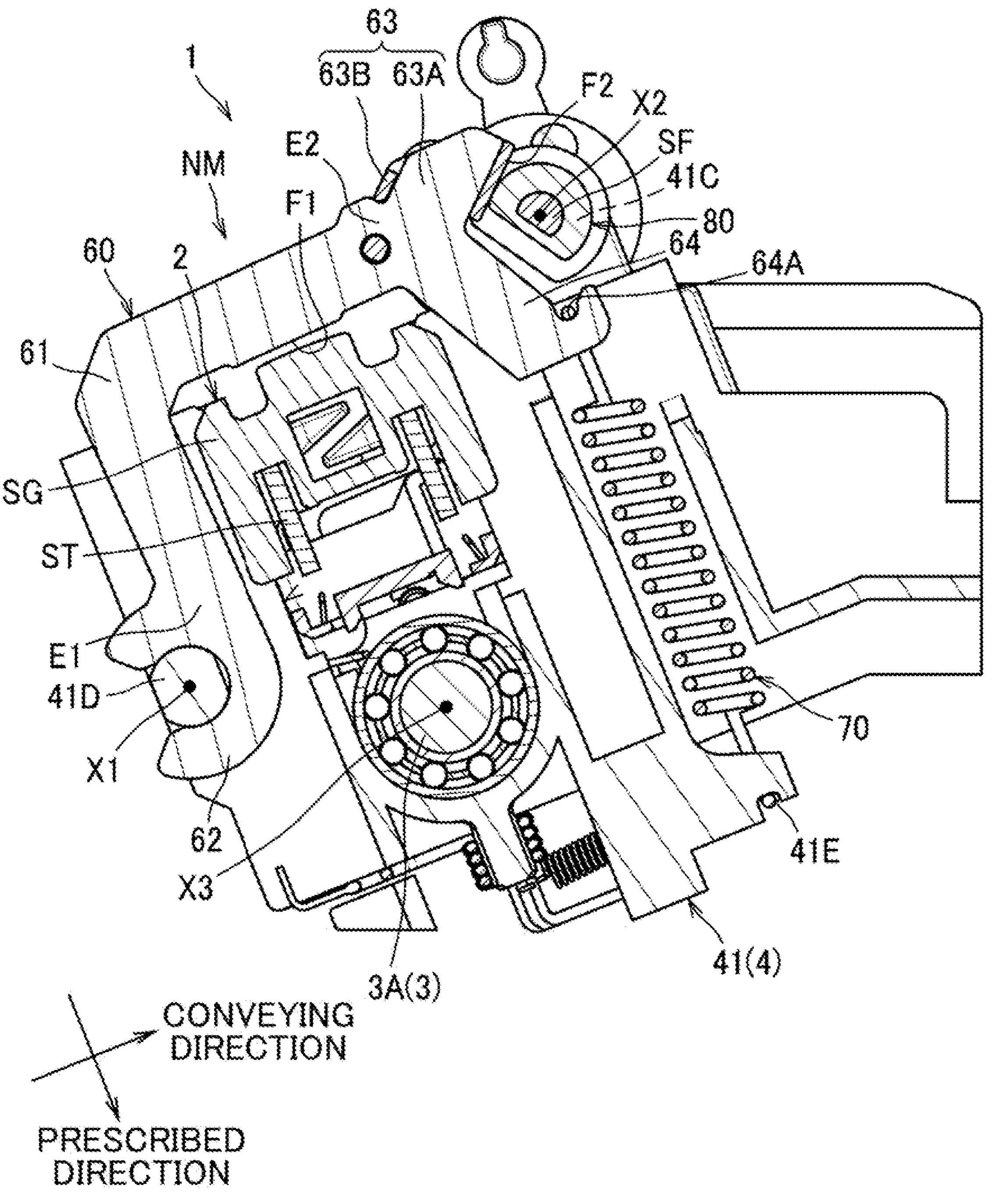
FIG. 3 is a schematic cross-sectional view of the nipping pressure changing mechanism of the fixing device in a state where a second nipping pressure is applied.

The pressure roller 3 is rotatable about a third axis X3 upon receipt of a drive force from a motor (not shown) provided in the main body of the image forming apparatus. The pressure roller 3 is configured to nip the sheet S at a nip region between the pressure roller 3 and the belt BL. The pressure roller 3 is rotatable to convey the sheet S in cooperation with the belt BL. As illustrated in FIGS. 1A, 2 and 3, the sheet S is assumed to be conveyed in a conveying direction at the nip region. The heating unit 2 is urged toward the pressure roller 3 in a prescribed direction (see FIGS. 2 and 3).

The pressure roller 3 has a peripheral surface whose hardness H, preferably, be at least 60 to at most 67 on the Asker C scale (i.e., in a range of 60≤H≤67 Asker C). More preferably, the hardness H of the peripheral surface of the pressure roller 3 be at least 62 to at most 67 on the Asker C scale (i.e., in a range of 62≤H≤67 Asker C). Most preferably, the hardness H of the peripheral surface of the pressure roller 3 be at least 64 to at most 66 on the Asker C scale (i.e., in a range of 64≤H≤66 Asker C). In the present embodiment, as illustrated in FIG. 4, the hardness H of the peripheral surface of the pressure roller 3 is measured on the Asker C scale using an Asker C durometer HT conforming to JIS K 7312 according to Japanese Industrial Standards.

As illustrated in FIG. 4, the pressure roller 3 includes a shaft 3A, an elastic layer 3B, and a surface layer 3C. The pressure roller 3 has an outer diameter DP of at least 20 millimeters to at most 22 millimeters (i.e., in a range of 20 mm≤DP≤22 mm).

The shaft 3A has a columnar shape, and is made of metal, for example.

The elastic layer 3B has a hollow cylindrical shape, and contains silicone rubber, for example. The elastic layer 3B covers a peripheral surface of the shaft 3A. The elastic layer 3B has an outer surface covered with the surface layer 3C. The elastic layer 3B has a thickness T of, preferably, at least 1 millimeter to at most 3 millimeters (i.e., in a range of 1 mm≤T≤3 mm). More preferably, the thickness T of the elastic layer 3B be at least 2 millimeters to at most 3 millimeters (i.e., in a range of 2 mm≤T≤3 mm). In the present embodiment, the thickness T of the elastic layer 3B is set to 2 millimeters.

The surface layer 3C contains fluororesin, for example. The surface layer 3C is coated on the outer surface of the elastic layer 3B.

In a state where the heating unit 2 and the pressure roller 3 form the nip region therebetween, the elastic layer 3B is deformed to provide a strain AS of, preferably, at least 25% to at most 60% (i.e., in a range of 25%≤AS≤60%). More preferably, the strain AS of the elastic layer 3B be at least 35% to at most 43% (i.e., in a range of 35%≤AS≤43%).

Figure 5A:
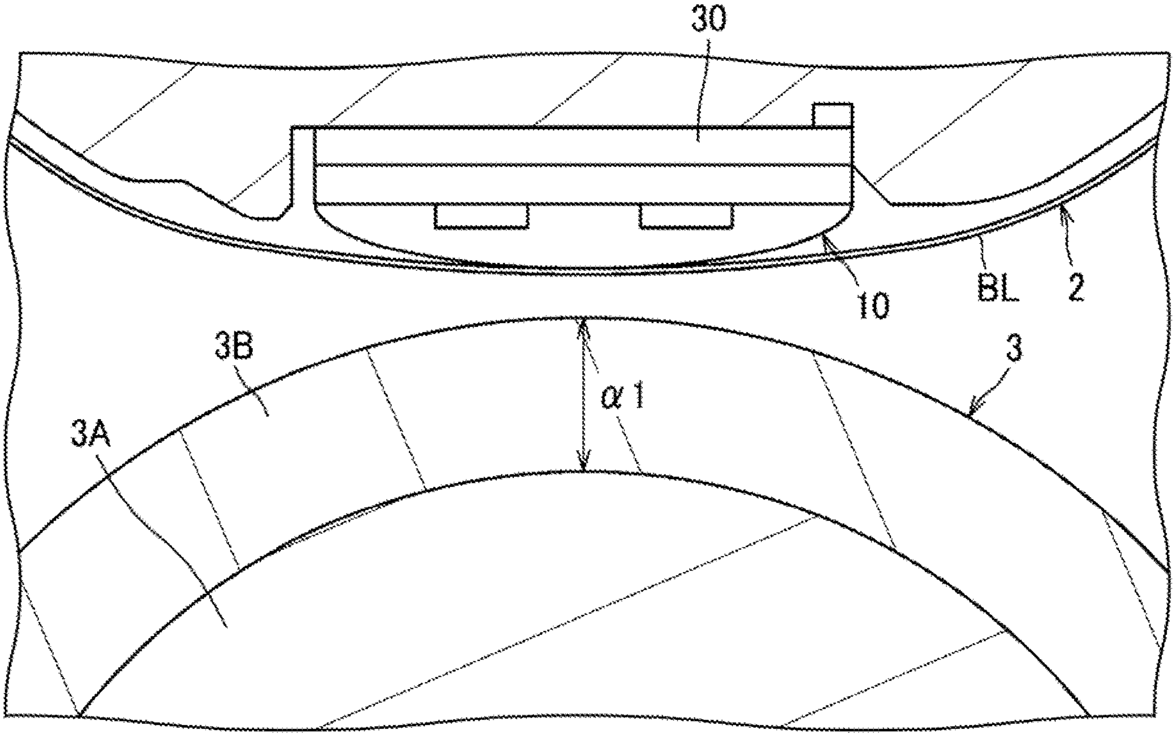
FIG. 5A is a cross-sectional view illustrating a state where the heating unit and the pressure roller are separated from each other.
Figure 5B:
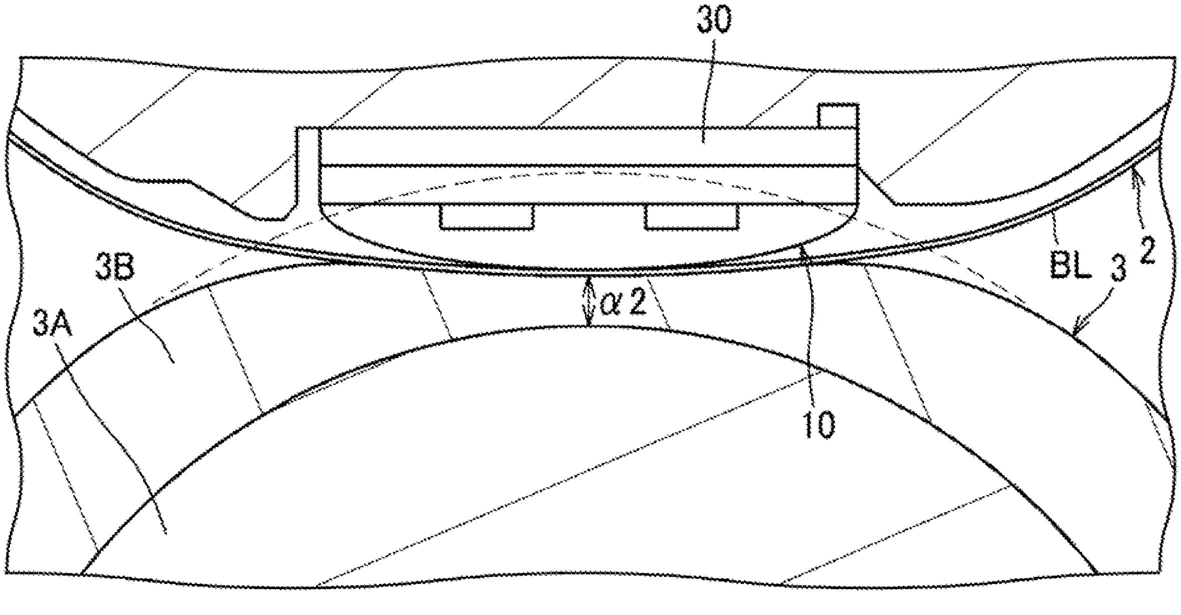
FIG. 5B is a cross-sectional view illustrating a state where the heating unit and the pressure roller are urged against each other to form a nip region therebetween.

Now, referring to FIGS. 5A and 5B, the strain AS of the elastic layer 3B will be described. FIG. 5A illustrates a state where the heating unit 2 and the pressure roller 3 are separated from each other so that the nip region is not formed therebetween, and FIG. 5B illustrates a state where the heating unit 2 and the pressure roller 3 are in pressure contact with each other to form the nip region therebetween. Here, the elastic layer 3B is assumed to provide a thickness $\alpha 1$ in the state of FIG. 5A where the nip region is not formed, whereas the elastic layer 3B is assumed to provide a thickness $\alpha 2$ in the state of FIG. 5B where the nip region is formed. In this example, the strain AS [%] of the elastic layer 3B is defined as a percentage of ($\alpha 1-\alpha 2$) relative to $\alpha 1$:

$$\text{Strain AS } [\%]=((\alpha 1-\alpha 2)/\alpha 1)\times 100.$$

As illustrated in FIG. 1, the frame 4 includes a first frame 41 and a second frame 42. The first frame 41 supports the heating unit 2 and the pressure roller 3. The second frame 42 is assembled to the first frame 41 such that the second frame 42 covers the heating unit 2 from a side thereof opposite the pressure roller 3.

As illustrated in FIG. 2, the fixing device 1 further includes a nipping pressure changing mechanism NM configured to change a nipping pressure between the heating unit 2 and the pressure roller 3.

The nipping pressure changing mechanism NM includes a shaft SF, a pair of pressure arms 60, a pair of pressure springs 70, and a pair of cams 80. The first frame 41 supports the pressure springs 70. The first frame 41 also pivotally movably supports the pressure arms 60 and the cams 80.

The pressure arms 60 are provided at respective end portions of the first frame 41 in an axial direction parallel to the third axis X3. Similarly, the cams 80 are provided at the respective end portions of the first frame 41 in the axial direction. Further, although not illustrated in the drawings, the pressure springs 70 are also provided at the respective end portions of the first frame 41 in the axial direction. In this way, since the nipping pressure changing mechanism NM has a structure generally the same as each other at respective ends thereof in the axial direction, a detailed description will be given mainly to the structure at one end of the nipping pressure changing mechanism NM in the axial direction.

The shaft SF extends in the axial direction. The shaft SF is made of metal, for example. The shaft SF has each end portion in the axial direction to which one of the cams 80 is fixed. The first frame 41 has a second support part 41C pivotably supporting the shaft SF.

As illustrated in FIG. 2, the second support part 41C pivotably supports the shaft SF such that the cam 80 is pivotable about a second axis X2 extending in the axial direction.

The pressure arm 60 is configured to apply pressure to the heating unit 2 to urge the heating unit 2 toward the pressure roller 3. The first frame 41 has a first support part 41D supporting the pressure arm 60 such that the pressure arm 60 is pivotable about a first axis X1. The first support part 41D is a substantially columnar-shaped projection. The first axis X1, the second axis X2, and the third axis X3 are respectively located at different positions from one another. The first axis X1, the second axis X2, and the third axis X3 respectively extend in parallel to one another. In other words, the first axis X1 extends in a direction parallel to the axial direction.

The pressure spring 70 is a tensile coil urging the pressure arms 60 toward the pressure roller 3. The pressure spring 70 urges the pressure arm 60 in a direction generally parallel to the prescribed direction (see FIGS. 2 and 3). The first frame 41 has a first spring hook 41E with which one end of the pressure spring 70 is engaged.

When the heating unit 2 and the pressure roller 3 are urged toward each other through the pressure springs 70 to form the nip region, preferably, the pressure roller 3 is applied with a load per unit length of at least 2.8 N/cm to at most 8.0 N/cm (i.e., in a range of 2.8 N/cm≤SL≤8.0 N/cm) in the axial direction.

The cam 80 is configured to press the pressure arm 60 against an urging force of the pressure spring 70. Specifically, the cam 80 is pivotable about the second axis X2 between a first position (depicted in FIG. 2) and a second position (depicted in FIG. 3).

When the cam 80 is at the first position, the nipping pressure at the nip region is a first nip pressure. When the cam 80 is at the second position, the nipping pressure at the nip region is a second nip pressure lower than the first pressure.

The pressure arm 60 has a main body 61, a supported part 62, a first tip part 63, and a second tip part 64.

The first tip part 63 has a base part 63A made of metal, and a cam follower 63B made of resin. The main body 61, the supported part 62, the base part 63A, and the second tip part 64 are integral and made of metal. The cam follower 63B is fitted with the base part 63A.

The main body 61 has a first end E1 and a second end E2. The main body 61 has a generally L-shape extending in a direction opposite the prescribed direction from the first end E1 and then extending toward downstream in the conveying direction to provide the second end E2 as a most downstream end in the conveying direction. The main body 61 also has a pressing surface F1 configured to press the heating unit 2 toward the pressure roller 3. The pressing surface F1 is positioned between the first end E1 and the second end E2 of the main body 61.

The heating unit 2 has each end portion in the axial direction at which a side guide SG is provided. The side guide SG supports each end portion of the stay ST in the axial direction. The pressing surface F1 is configured to press the side guide SG toward the pressure roller 3.

The supported part 62 is positioned at the first end E1 of the main body 61. The supported part 62 is supported by the first support part 41D of the first frame 41.

The first tip part 63 is positioned at the second end E2 of the main body 61. The first tip part 63 has a pressure-receiving surface F2 configured to be pushed by the cam 80. More specifically, the base part 63A extends to be inclined relative to the conveying direction such that the base part 63A extends from the second end E2 of the main body 61 in a direction away from the pressure roller 3 in the prescribed direction toward downstream in the conveying direction. The cam follower 63B fitted with the base part 63A has the pressure-receiving surface F2.

The second tip part 64 is positioned at the second end E2 of the main body 61. The second tip part 64 extends in a direction different from the direction in which the first tip part 63 extends. The second tip part 64 has a second spring hook 64A with which another end of the pressure spring 70 is engaged.

Technical Advantages of the Embodiment

With the configuration according to the embodiment described above, the following technical advantages can be obtained.

In the fixing device 1 according to the embodiment, the elastic layer 3B of the pressure roller 3 has the thickness T of at least 1 millimeter to at most 3 millimeters (in the range of 1 mm≤T≤3 mm), and the peripheral surface of the pressure roller 3 has the hardness H of at least 30 to at most 67 on the Asker C scale (in the range of 60≤H≤67 Asker C). With this configuration, the nip region is ensured to have an appropriate width for performing thermal fixing of the sheet S, while thermal expansion of the elastic layer 3B of the pressure roller 3 may have less impact on the nip width. As a result, even if the elastic layer 3B of the pressure roller 3 undergoes thermal expansion, the nip width is less likely to vary, and thermal fixation and conveyance of the sheet S can be readily performed at the fixing device 1.

The pressure roller 3 has the outer diameter DP of at least 20 millimeters to at most 22 millimeters (in the range of 20 mm≤DP≤22 mm). Accordingly, the pressure roller 3 can be made compact, thereby realizing downsizing of the fixing device 1 as a whole.

The outer surface of the elastic layer 3B of the pressure roller 3 is coated by the surface layer 3C containing fluororesin. Accordingly, durability of the pressure roller 3 can be improved.

The belt BL of the heating unit 2 has the outer peripheral length LB of at least 75 millimeters to at most 82 millimeters (in the range of 75 mm≤LB≤82 mm). With this configuration, the heating unit 2 can be made compact to realize downsizing of the fixing device 1.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the elastic layer of the pressure roller of the disclosure need not be made of silicone rubber, but may be made of other materials. Further, the surface layer of the pressure roller need not be made of fluororesin, but may be made of other materials.

The pressure spring of the disclosure need not be a tensile coil, but may be a torsion spring, for example.

The heater of the disclosure need not be a ceramic heater, but may be a halogen lamp, for example. In this case, the heating unit of the disclosure may be configured as an assembly including a belt, a nip plate that nips the belt between the pressure roller and the nip plate, and a heater for heating the nip plate.

Those elements described in the embodiment and modifications thereto may be combined as appropriate.

EXAMPLES

Hereinafter, examples of the disclosure will be described with reference to FIG. 6. FIG. 6 is a table showing respective configurations of examples 1-10 and comparative examples 1-3, and respective evaluations therefor.

Evaluation Method

In the examples 1 to 10 and comparative examples 1, 2 and 3, the hardness H of the peripheral surface of the pressure roller 3 on the Asker C scale and the thickness T of the elastic layer 3B of the pressure roller 3 in the fixing device 1 were changed respectively as shown in FIG. 6. With respect to the respective examples 1 to 10 and comparative examples 1, 2 and 3, fixing performance of toner and conveying performance of the sheet S were evaluated, and evaluations for the respective examples were made as "excellent" (A+), or "good" (A), or "fail" (F). The hardness H was measured on the Asker C scale by pressing an indentor of the durometer HT (conforming to JIS K 7312, see FIG. 4) against the peripheral surface of the pressure roller 3, as in the embodiment.

Specifically, the evaluation of the fixing performance was made based on whether toner was peeled off the sheet S after a toner image was fixed to the sheet S. Whether the toner was peeled off or not was determined based on a rate of decrease in reflection density that indicates by how much the toner was peeled off the sheet S. The rate of decrease in reflection density was calculated, using a reflection densitometer, based on reflection densities that were obtained under the following two conditions.

Condition 1: measuring a density of a toner image fixed to the sheet S without applying any treatment to the toner image.

Condition 2: measuring the toner image formed on the sheet S after performing a friction fastness test on the toner image on the sheet S (condition 1) by rubbing the toner image, with cloth, at a prescribed pressure for a prescribed period of time.

The rate of decrease in the reflection density can be calculated by the following formula:

100×(reflection density measured under the condition 1−reflection density measured under the condition 2)/(reflection density measured under the condition 1).

According to this formula, the fixing performance improves as the rate of decrease in reflection density becomes lower. Accordingly, when the reflection density decrease rate is smaller than 10%, an evaluation of "excellent" (A+) is made. When the reflection density decrease rate is determined to be within a range between 10% and 20%, an evaluation of "good" (A) is made. When the reflection density decrease rate exceeds 20%, an evaluation of "fail" (F) is made.

The evaluation of the conveying performance was made by checking the sheet S after the toner image was fixed to the sheet S. Specifically, after visually confirming if there is any wrinkle on the sheet S, the conveying speed of the sheet S was measured and compared with a target value.

When there was little wrinkle on the sheet S and the conveying speed of the sheet S was in a range of 98.5% to 101.5% relative to the target value, an "excellent" (A+) evaluation was made.

When there was little wrinkle on the sheet S and the conveying speed of the sheet S was in a range of 97.5% to 98.5% or in a range of 101.5% to 102.5% relative to the target value, a "good" (A) evaluation was made.

When wrinkles appeared on the sheet S, or when the conveying speed of the sheet S was smaller than 97.5% or greater than 102.5% relative to the target value, a "fail" (F) evaluation was made.

In the respective examples and comparative examples, a spring load was determined as appropriate to provide the suitable nip width in the conveying direction of the sheet S after determination of the Asker C hardness H of the pressure roller 3, the thickness T of the elastic layer 3B, and the outer diameter DP of the pressure roller 3. The spring load may be adjusted by changing the strength of the pressure spring 70.

As illustrated in FIG. 6, in the examples 1 to 10, the "roller hardness H" (the hardness H of the pressure roller 3) was set to be in a rage of at least 60 to at most 67 on the Asker C scale. The "elastic layer thickness T" (the thickness T of the elastic layer 3B) was set to 2 millimeters a baseline. For those cases where the roller hardness H is set to 63 on the Asker C scale (among the examples 3-5), the elastic layer thickness T of 3 millimeters was also tested in the example 4. For the case where the roller hardness H is set to 60 on the Asker C scale (in the example 1), the elastic layer thickness T of 3 millimeters was tested alone. For the cases where the roller hardness H is set to 67 on the Asker C scale (among the examples 8-10), the elastic layer thickness T of 1 millimeter was also tested in the example 9.

The tests show the following results.

In those cases where the roller hardness H is in the range of at least 62 to at most 67 on the Asker C scale, the fixing performance and the conveying performance were both determined to be "excellent" (A+) in all the examples, provided that the elastic layer thickness T was 2 millimeters. In those cases where the elastic layer thickness T was 3 millimeters (in the example 1 where the roller hardness H was 60 Asker C; and in the example 4 where the roller hardness H was 63 Asker C), the fixing performance was determined to be "excellent" (A+) but the conveying performance was determined to be "good" (A) due to an increase in the nip width. On the other hand, in the case where the elastic layer thickness T was set to 1 millimeter (in the example 9 where the roller hardness H was set to 67 Asker C), the conveying performance was determined as "excellent" (A+) but the fixing performance was evaluated as "good" (A) due to a reduction in the nip width.

In the comparative example 1, tests were carried out under the same conditions as the example 1, except for the roller hardness H on the Asker C scale. Specifically, the roller hardness H was set to be smaller than 60 Asker C in the comparative example 1. To be more specific, in the comparative example 1, the roller hardness H was set to be 59 Asker C. According to the tests performed with respect to the comparative example 1, the fixing performance was determined to be "good" (A) but the conveying performance was determined to be "fail" (F) due to instability in the conveyance of the sheet S. The comparative example 1 revealed that, preferably, the roller hardness H be at least 60 on the Asker C scale in order to satisfy both the fixing performance and the conveying performance.

In the comparative example 2, tests were carried out under the same conditions as the example 1, except for the elastic layer thickness T. Specifically, the elastic layer thickness T was set to 4 millimeters in the comparative example 2. According to the tests performed with respect to the comparative example 2, the fixing performance was determined to be "good" (A) but the conveying performance was determined to be "fail" (F) due to the instability in the conveyance of the sheet S. The comparative example 2 revealed that, preferably, the elastic layer thickness T be set to 3 millimeters or less in order to balance the fixing performance and the conveying performance.

In the comparative example 3, tests were carried out under the same conditions as the example 9, except for the roller hardness H on the Asker C scale. Specifically, the roller hardness H was set to be 68 Asker C or more in the comparative example 3. To be more specific, in the comparative example 3, the roller hardness H was set to be 68 Asker C. According to the tests performed with respect to the comparative example 3, both of the fixing performance and the conveying performance were determined as "fail" (F). The comparative example 3 revealed that, preferably, the roller hardness H be set to 67 Asker C or less in order to satisfy both the fixing performance and the conveying performance.

The test results described above confirmed that, preferably, the roller hardness H be set to be at least 60 to at most 67 Asker C (i.e., in the range of $60 \leq H \leq$ to 67 on the Asker C scale) and the elastic layer thickness T be set at least 1 millimeter to at most 3 millimeters (i.e., in the range of 1 mm$\leq T \leq$3 mm). Practically, manufacturing the elastic layer with the thickness T of less than 1 millimeter seems to be impossible due to actual manufacturing constraints. Indeed, a fixing device employing an elastic layer having a thickness of less than 1 millimeter is unlikely to provide a sufficient nip width, and, hence, deterioration in the fixing performance would be a likely result.

Further, in the described examples 1-10, both the fixing performance and the conveying performance were turned to be "excellent" (A) when the roller hardness H was equal to or greater than 62 Asker C. Hence, the roller hardness H be preferably in a range of at least 62 to at most 67 Asker C. Further preferably, the roller hardness H be in a range of at least 62 to at most 66 Asker C, since the fixing performance was determined to be "excellent" (A+) when the roller hardness H was equal to or smaller than 66 Asker C.

Remarks

The fixing device 1 is an example of a fixing device of the disclosure. The heater 10 is an example of a heater. The heating unit 2 is an example of a rotatable body. The pressure roller 3 is an example of a pressure roller. The shaft 3A is an example of a shaft of the pressure roller. The elastic layer 3B is an example of an elastic layer of the pressure roller. The belt BL is an example of an endless belt of the rotatable body. The base layer B1 is an example of a base layer of the endless belt. The elastic layer B2 is an example of an elastic layer of the endless belt. The thickness α1 of the elastic layer 3B is an example of a first thickness of the elastic layer of the pressure roller. The thickness α2 of the elastic layer 3B is an example of a second thickness of the elastic layer of the pressure roller. The surface layer B3 is an example of a surface layer of the endless belt.

What is claimed is:

1. A fixing device incorporated in a main body of an image forming apparatus, the fixing device comprising:

a heater;

a rotatable body configured to be heated by the heater; and a pressure roller configured to form a nip region in cooperation with the rotatable body to nip a sheet at the nip region between the pressure roller and the rotatable body, the pressure roller comprising:

a shaft; and an elastic layer covering a peripheral surface of the shaft, the elastic layer having a thickness of at least 1 millimeter to at most 3 millimeters, wherein the pressure roller has a peripheral surface whose hardness is in a range of at least 62 to at most 67 on the Asker C scale.

2. The fixing device according to claim 1, wherein the pressure roller has an outer diameter that is in a range of at least 20 millimeters to at most 22 millimeters.

3. The fixing device according to claim 1, wherein the elastic layer contains silicone rubber.

4. The fixing device according to claim 1, wherein the elastic layer has an outer surface that is coated with a layer containing fluororesin.

5. The fixing device according to claim 1, wherein the rotatable body is an endless belt configured to circularly move to convey the sheet in cooperation with the pressure roller.

6. The fixing device according to claim 5, wherein the endless belt has an outer circumferential length that is in a range of at least 75 millimeters to at most 82 millimeters.

7. The fixing device according to claim 5, further comprising a cam configured to move one of the endless belt and the pressure roller away from a remaining one of the endless belt and the pressure roller so as not to form the nip region between the endless belt and the pressure roller, wherein the elastic layer has a first thickness when the endless belt and the pressure roller do not form the nip region therebetween, and the elastic layer has a second thickness when the endless belt and the pressure roller form the nip region therebetween, and wherein the elastic layer is deformed to provide a strain that is in a range of at least 25% to at most 60% when the endless belt and the pressure roller form the nip region therebetween, the strain being calculated based on a difference between the first thickness and the second thickness.

8. The fixing device according to claim 5, wherein the endless belt comprises:

a base layer containing polyimide;

an elastic layer covering an outer surface of the base layer and containing silicone rubber; and a surface layer covering an outer surface of the elastic layer and containing fluororesin.

9. The fixing device according to claim 5, wherein the heater comprises a substrate and a resistance heating element mounted on the substrate, and wherein the heater is configured to contact an inner peripheral surface of the endless belt.

10. The fixing device according to claim 1, further comprising a spring configured to urge one of the rotatable body and the pressure roller toward a remaining one of the rotatable body and the pressure roller, wherein the pressure roller is rotatable about a rotatable axis extending in an axial direction, and wherein, when the spring urges the one of the rotatable body and the pressure roller to nip the sheet therebetween, the pressure roller is applied with a load per unit length in the axial direction that is in a range of at least 2.8 N/cm to at most 8.0 N/cm.

11. The fixing device according to claim 1, wherein the pressure roller is configured to rotate upon receipt of a drive force from a motor, and wherein the rotatable body is configured to rotate following rotation of the pressure roller.

* * * * *